United States Patent
Nozawa

(10) Patent No.: US 7,692,407 B2
(45) Date of Patent: Apr. 6, 2010

(54) TERMINAL DEVICE

(75) Inventor: Tetsufumi Nozawa, Fanabashi (JP)

(73) Assignee: Sony Computer Entertainment Inc., Tokyo (JP)

( * ) Notice: Subject to any disclaimer, the term of this patent is extended or adjusted under 35 U.S.C. 154(b) by 482 days.

(21) Appl. No.: 11/751,689

(22) Filed: May 22, 2007

(65) Prior Publication Data

US 2008/0054851 A1    Mar. 6, 2008

(30) Foreign Application Priority Data

May 24, 2006  (JP)  .............................. 2006-143771

(51) Int. Cl.
*H02J 7/00*  (2006.01)
(52) U.S. Cl. ...................... 320/137; 320/160
(58) Field of Classification Search ................ 320/130, 320/131, 134, 136, 137, 160, 162; 318/139
See application file for complete search history.

(56) References Cited

U.S. PATENT DOCUMENTS

| | | | |
|---|---|---|---|
| 5,767,587 A * | 6/1998 | Nishikiori | 307/9.1 |
| 6,181,103 B1 * | 1/2001 | Chen | 320/106 |
| 6,222,347 B1 * | 4/2001 | Gong | 320/137 |

FOREIGN PATENT DOCUMENTS

| | | |
|---|---|---|
| JP | 11-308779 | 11/1999 |
| JP | 2005-211665 | 8/2005 |
| WO | 2004075371 | 9/2004 |

OTHER PUBLICATIONS

Notification of Reason(s) for Refusal dated February 9, 2010, for corresponding Japanese Application No. JP 2006-143771.

* cited by examiner

*Primary Examiner*—Patrick J Assouad
*Assistant Examiner*—M'Baye Diao
(74) *Attorney, Agent, or Firm*—Katten Muchin Rosenman LLP

(57) ABSTRACT

A technology for charging the battery of a terminal device with efficiency. In a wireless game controller, a charge control unit supplies electric power from an external power supply to a battery. A communication management unit receives a drive request signal to a vibrating motor. A motor control unit supplies a drive current to the vibrating motor in accordance with the drive request signal. The charge control unit performs charge control for the battery in a first mode when the communication management unit does not receive the drive request signal, and performs charge control for the battery in a second mode when the communication management unit does receive the drive request signal. The charge control unit performs the charge control for the battery in the first mode using a charging current higher than that in the second mode.

4 Claims, 7 Drawing Sheets

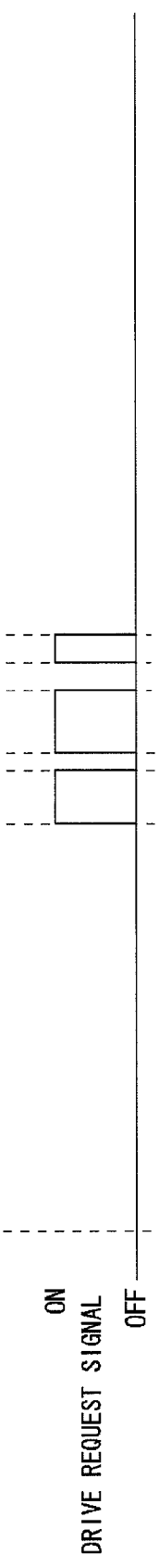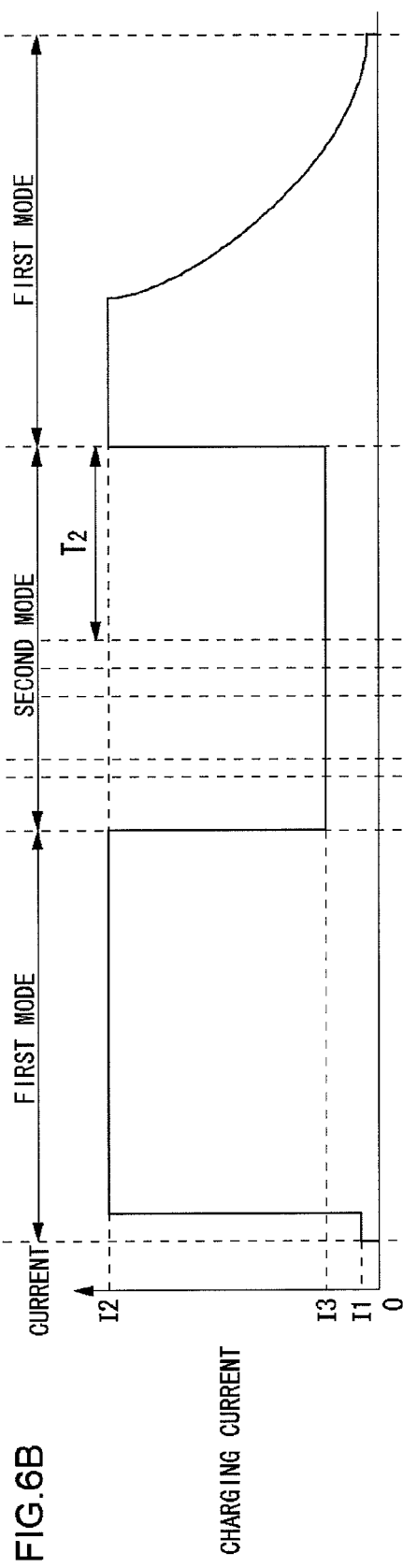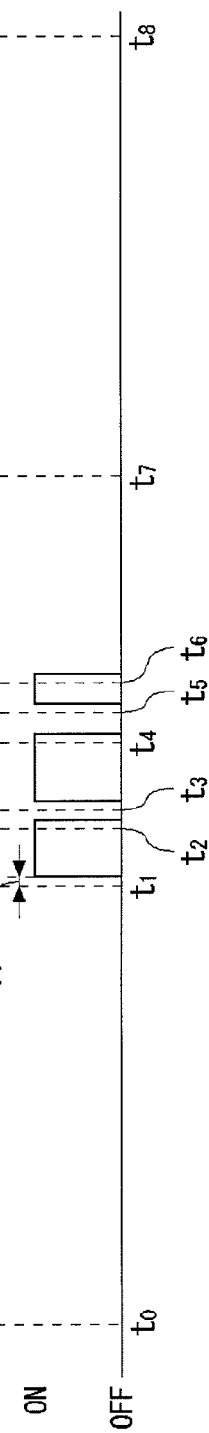

TERMINAL DEVICE

BACKGROUND OF THE INVENTION

1. Field of the Invention

The present invention relates to a technology for charging a terminal device, and in particular to a charging technology for controlling a charging current to be supplied to a battery.

2. Description of the Related Art

Among rechargeable batteries, lithium ion batteries are attracting attention. The lithium ion battery has positive electrodes of lithium cobalt oxide ($LiCoO_2$) and negative electrodes of graphite (carbon), and is configured so that the electrode plates are stacked in layers. Charge control for the lithium ion battery is such that a preliminary charge (precharge) is performed with a low current until the battery voltage exceeds a predetermined threshold, followed by a quick charge with a charging current higher than the preliminary charging current once the predetermined threshold has been exceeded (for example, see Japanese Patent Publication No. 3758361).

In some game systems, game controllers which communicate with game apparatuses by wireless means have been developed. The use of wireless game controllers makes it possible for users to freely play games from different positions. Conventional wired game controllers include some that have a mechanism for driving vibrating motors, thereby transmitting virtual vibrations during game play to the players. It is also desirable that wireless game controllers implement such vibrating motors. In general, the drive current required by a vibrating motor is higher than the system current that is consumed steadily by ICs inside a wireless game controller.

The battery of a wireless game controller is charged, for example, when connected to an external power supply through a universal serial bus (USB) cable or the like. When the battery charge level remaining becomes low during game play, the user connects the USB cable to the external power supply to charge the battery quickly while continuing the game. During this time, a drive request signal to the vibrating motor may sometimes be transmitted from the game apparatus, requesting that the vibrating motor be driven. It has thus been desired to develop a technology for performing efficient charge control for the battery even in these situations. Aside from the wireless game controllers that implement vibrating motors, the same need holds for other terminal devices that have loads to consume high currents sporadically during charging.

SUMMARY OF THE INVENTION

In view of the foregoing, a general purpose of the present invention is to provide a technology for efficiently charging the battery of a terminal device that has a load with relatively high current consumption.

To solve the foregoing problem, a terminal device according to one embodiment of the present invention includes: a battery which stores electric power; a charge control unit which supplies electric power from an external power supply to the battery; a load which is driven by a drive current supplied thereto; a communication management unit which receives a drive request signal for the load; and a load control unit which supplies the drive current to the load in accordance with the drive request signal. In this terminal device, the charge control unit performs charge control for the battery in a first mode when the communication management unit does not receive the drive request signal, and performs charge control for the battery in a second mode when the communication management unit does receive the drive request signal.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which:

FIGS. 6A to 6C are timing charts of the charge processes according to the embodiment.

DETAILED DESCRIPTION OF THE INVENTION

The invention will now be described by reference to the preferred embodiments. This does not intend to limit the scope of the present invention, but to exemplify the invention.

Figure 1:
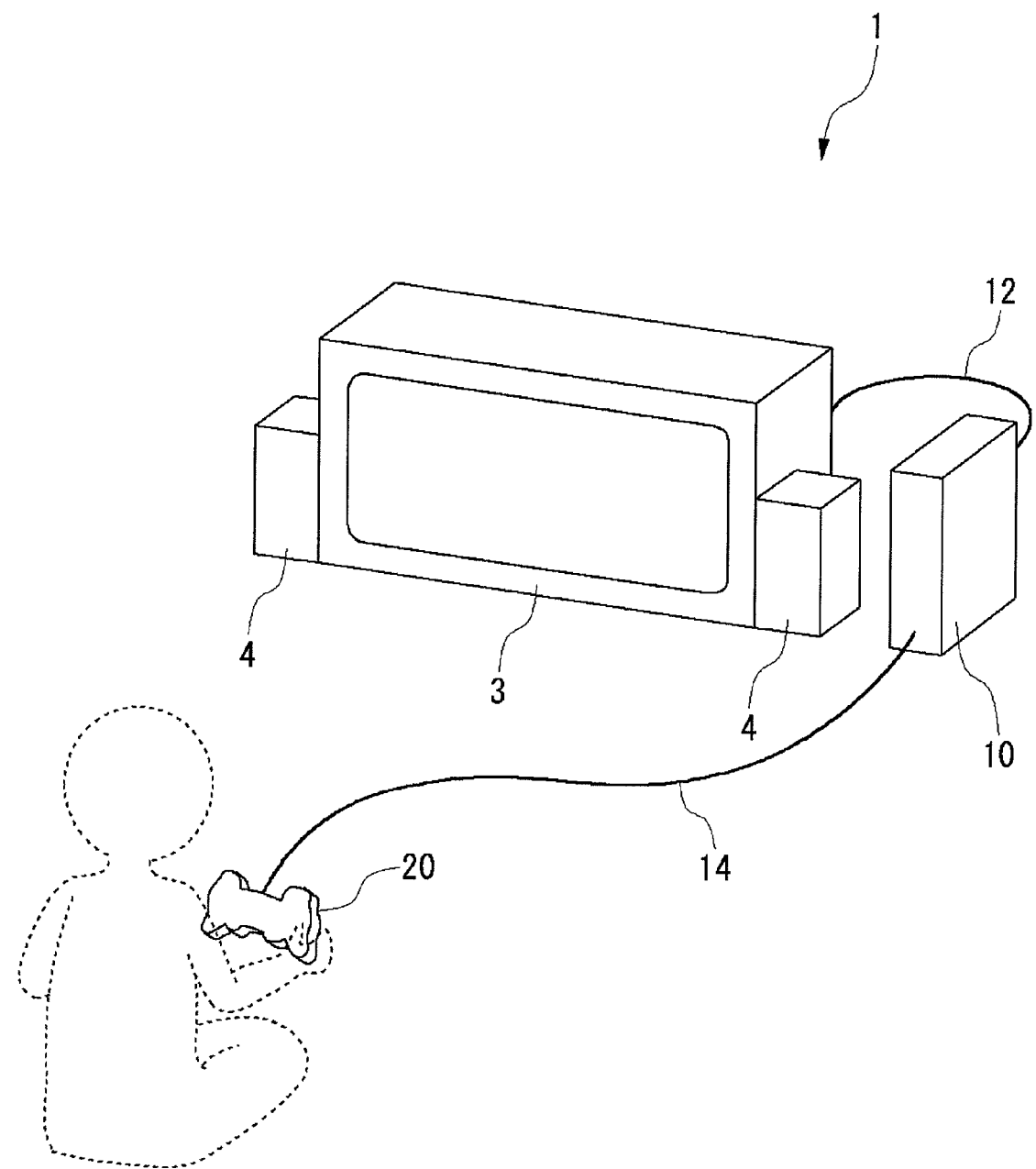
FIG. 1 is a diagram showing the use environment of a game system according to an embodiment of the present invention.

FIG. 1 shows the use environment of a game system according to an embodiment of the present invention. The game system 1 includes an image display apparatus 3, a sound output apparatus 4, a game apparatus 10, and a wireless game controller 20. The image display apparatus 3, the sound output apparatus 4, and the wireless game controller 20 are connected to the game apparatus 10. The wireless game controller 20 is a terminal device for a user to make operation inputs. The game apparatus 10 is a processing unit which processes a game application based on the operation inputs from the wireless game controller 20, and generates image signals and sound signals that show the result of processing of the game application. The wireless game controller 20 and the game apparatus 10 communicate with each other at predetermined intervals.

The image display apparatus 3 is a display for outputting image signals. It receives the image signals generated by the game apparatus 10, and displays a game screen. The sound display apparatus 4 consists of speakers for outputting sound. It receives the sound signals generated by the game apparatus 10, and outputs game sound. The image display apparatus 3 and the sound output apparatus 4 constitute an output apparatus of the game system 1. The game apparatus 10, the image display apparatus 3, and the sound output apparatus 4 may be connected either with an AV cable 12 or by wireless means.

The wireless game controller 20 is driven by a not-shown battery, and comprises an operation input unit which includes a plurality of buttons and keys for making operation inputs for game progress. The wireless game controller 20 has the function of transmitting user's operation inputs to the game apparatus 10 wirelessly. When the user operates the buttons and keys on the wireless game controller 20, those operation inputs are transmitted to the game apparatus 10 wirelessly. The wireless game controller 20 and the game apparatus 10 may establish wireless communication using Bluetooth™ protocols. The game apparatus 10 receives operation inputs pertaining to the game application from the wireless game controller 20, controls the progress of the game in accordance with the operation inputs, and generates game image signals and game sound signals. The game image signals and game sound signals generated are output from the image display apparatus 3 and the sound output apparatus 4, respectively. The game apparatus 10 also has the function of transmitting a drive request signal for vibrating the wireless game controller 20 to the wireless game controller 20 in accordance with the progress of the game application. The wireless game controller 20 contains a vibrating motor, and makes the vibrating motor vibrates when it receives the drive request signal.

FIG. 1 shows a situation in which a wireless game controller 20 is charged through a USB cable 14. When the wireless game controller 20 and the game apparatus 10 are wire-connected with the USB cable 14, the user can play games while charging the battery of the wireless game controller 20. It should be appreciated that the USB cable 14 need not be used to connect the wireless game controller 20 to the game apparatus 10 in normal use situations other than when charging the battery.

The wireless game controller 20 may be configured to be capable of performing wired communication with the game apparatus 10 through the USB cable 14 while it is supplied with electric power from the game apparatus 10 through the USB cable 14. When this communication-switching function is implemented in the wireless game controller 20, the connection of the USB cable 14 intended for charging can also be utilized for communication. In general, wired communication transmits data more stably than wireless communication. More stable data transmission can thus be achieved by enabling wired communication when the USB cable 14 is connected. The wired communication also has the advantage that data can be transmitted at higher speeds than with wireless communication.

Figure 2:
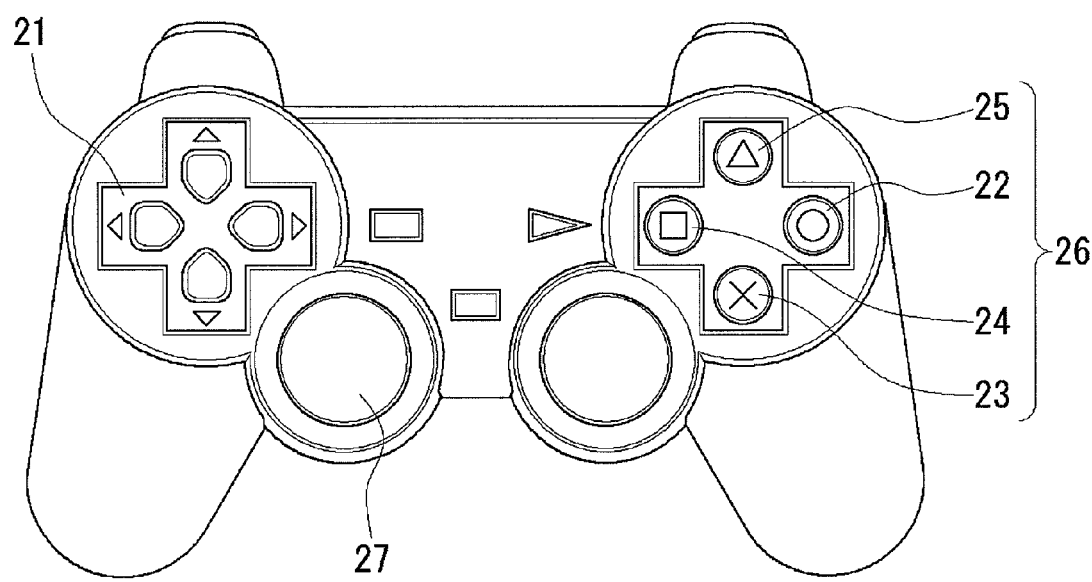
FIG. 2 is a diagram showing the appearance and configuration of a controller.

FIG. 2 shows the appearance and configuration of the controller. The controller 20 has arrow keys 21, analog sticks 27, and four types of operation buttons 26. The arrow keys 21, the analog sticks 27, and the operation buttons 26 constitute an operation input unit on the top of the case. The four types of buttons 26 are marked with different symbols in different colors to distinguish them from each other. More specifically, the ○ button 22 is marked with a red circle, the x button 23 a blue cross, the □ button 24 a purple square, and the Δ button 25 a green triangle.

Figure 3:
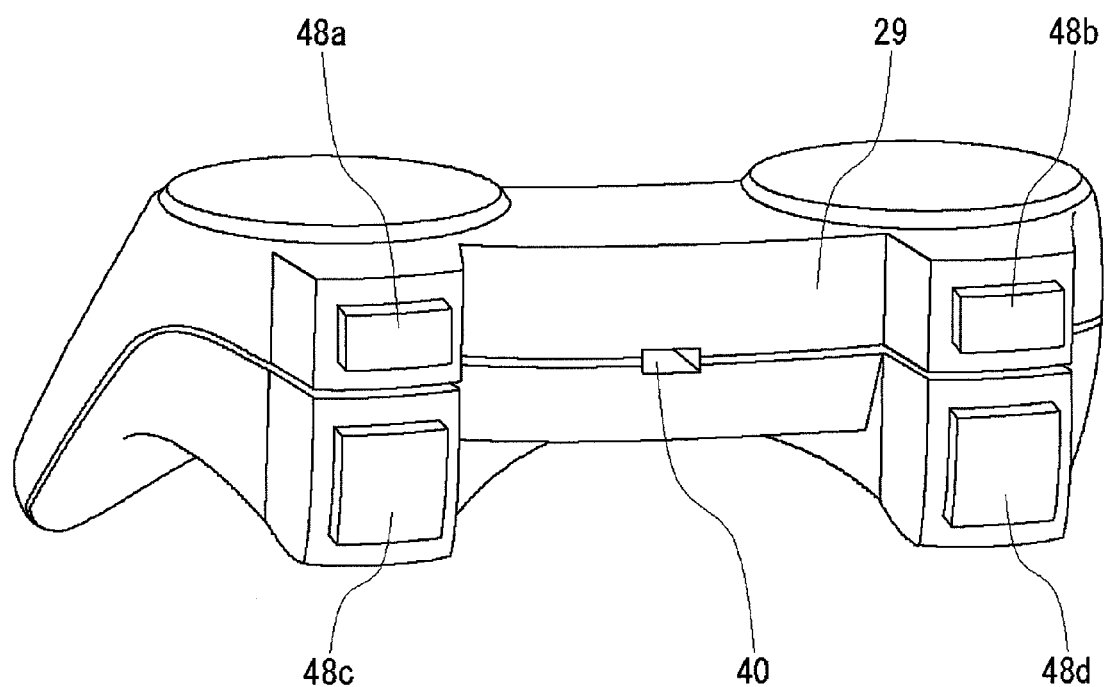
FIG. 3 is a diagram showing the appearance and configuration of the controller when viewed from the rear side.

FIG. 3 shows the appearance and configuration of the controller when viewed from the rear side. In FIG. 3, the arrow keys 21, the operation buttons 26, and the like provided on the case top of the wireless game controller 20 are omitted. Operation buttons 48a, 48b, 48c, and 48d are arranged in right and left areas of a case rear 29. The operation buttons 48 constitute the operation input unit along with the arrow keys 21, the operation buttons 26, etc. A USB connector 40 is formed in the center of the case rear 29. A USB cable extended from the game apparatus 10 can be plugged into the USB connector 40 for the purpose of charge processing on the wireless game controller 20. The USB cable connection allows the wireless game controller 20 to be used as a wired controller.

Figure 4:
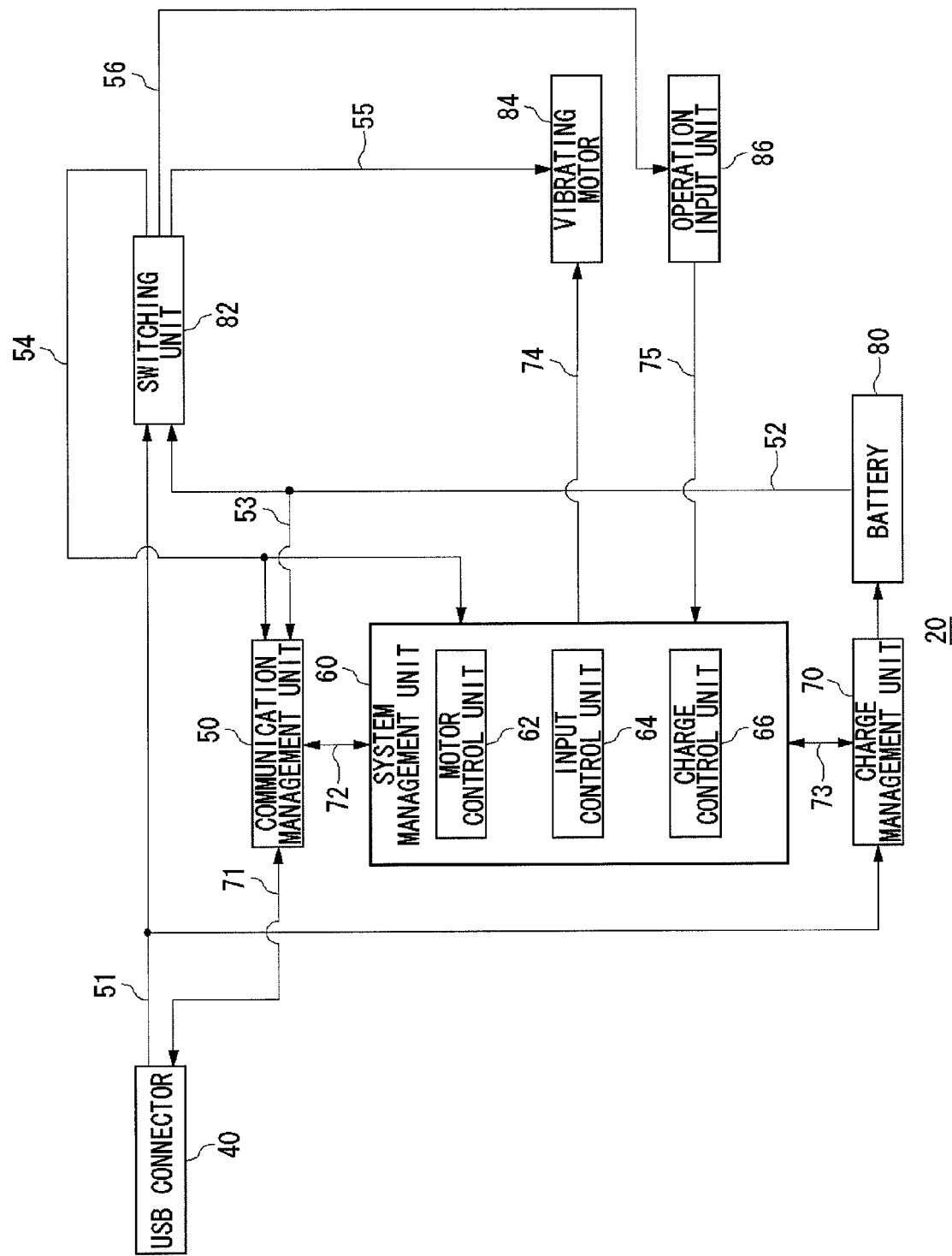
FIG. 4 is a diagram showing the internal configuration of the controller.

FIG. 4 shows the internal configuration of the controller. The wireless game controller 20 includes the USB connector 40, a communication management unit 50, a system management unit 60, a charge management unit 70, a battery 80, a switching unit 82, a vibrating motor 84, and an operation input unit 86. The system management unit 60 includes a motor control unit 62, an input control unit 64, and a charge control unit 66. The operation input unit 86 is composed of the arrow keys 21, the operation buttons 26, and the like. The vibrating motor 84 is a load which is driven by a drive current supplied thereto. In the present embodiment, the vibrating motor 84 consists of two motor elements 84a and 84b (see FIG. 7).

The communication management unit 50, the system management unit 60, and the charge management unit 70 are configured to include respective IC chips. The communication management unit 50, the system management unit 60, and the charge management unit 70 may be composed of an IC chip each, or an IC chip and electronic elements formed on a circuit board. Their respective functions can be modularized to allow independent designing, with a reduced time for system design. It should be appreciated that the functions of the communication management unit 50, the system management unit 60, and the charge management unit 70 may be integrated into one or two IC chips.

The battery 80 is a lithium ion battery which stores electric power for driving the components of the wireless game controller 20. The switching unit 82 includes diodes, and accepts the higher voltage of those supplied from power supply lines 51 and 52. The maximum voltage of the battery 80 is set to approximately 4.2 V. Meanwhile, the voltage to be supplied from an external power supply through the USB connector 40 during charging is approximately 5 V. Consequently, when the wireless game controller 20 is not connected to the USB cable 14, the battery 80 supplies electric power to the components of the wireless game controller 20 through the power supply lines 54, 55, and 56. Conversely, when the wireless game controller 20 is connected to the USB cable 14, the components of the wireless game controller 20 are driven by the electric power that is supplied from the external power supply through the power supply lines 54, 55, and 56.

The communication management unit 50 manages and controls communication with the game apparatus 10. When the wireless game controller 20 and the game apparatus 10 are connected to the USB cable 14, the communication management unit 50 transmits and receives data to/from the game apparatus 10 through a signal line 71. Conversely, when the wireless game controller 20 and the game apparatus 10 are not connected with the USB cable 14, the communication management unit 50 transmits and receives data to/from the game apparatus 10 using Bluetooth protocols. As above, the communication management unit 50 has the function of performing either wired communication or wireless communication selectively depending on whether or not the USB cable 14 is used to connect the wireless game controller 20 to the game apparatus 10.

In the system management unit 60, the input control unit 64 monitors operation inputs from the operation input unit 86 through a signal line 75 at predetermined sampling periods. If there is any operation input, the input control unit 64 overwrites operation input data in an input buffer (not shown), and sends it to the communication management unit 50. The communication management unit 50 transmits the operation input data to the game apparatus 10 at predetermined communication intervals.

The communication management unit 50 receives an instruction signal from the game apparatus 10 at predetermined communication intervals for determining whether or not to enable driving of the vibrating motor 84. This instruction signal is either the drive request signal for requesting driving or a drive stop signal for not requesting driving. Packet signals to be transmitted from the game apparatus 10 have a data field that is reserved for retaining this instruction signal. Either the drive request signal or the drive stop signal is written in that data field. The drive request signal or the drive stop signal may be written into packet signals as 1-bit information for specifying drive-ON or -OFF. The drive request signal or the drive stop signal is transmitted to the system management unit 60 through a signal line 72.

The motor control unit 62 supplies a drive current to the vibrating motor 84 through a signal line 74 in response to the drive request signal. This drives the vibrating motor 84, vibrating the case of the wireless game controller 20. In general, the drive request signal is transmitted over a plurality of consecutive packet signals, and the vibrating motor 84 continues vibrating for as long as the drive request signal continues to be transmitted. The motor control unit 62 also stops supplying the drive current to the vibrating motor 84 in response to the drive stop signal. As will be described later, the motor control unit 62 preferably supplies the drive current to the vibrating motor 84 after the elapse of a predetermined time interval from when the communication management unit 50 receives the drive request signal, instead of supplying the drive current to the vibrating motor 84 immediately at the time of reception.

Cooperating with the charge management unit 70, the charge control unit 66 supplies the battery 80 with electric power supplied from the external power supply through the power supply line 51. Since the charge management unit 70 is also involved in charge control, the charge control unit 66 and the charge management unit 70 may collectively be referred to as a charge control unit. In response to a charge start instruction from the charge control unit 66, the charge management unit 70 performs charge processing for the battery 80. In the wireless game controller 20 of the present embodiment, the charge control unit 66 controls the charge management unit 70 to implement a plurality of different modes of charge processing.

The charge control unit 66 performs charge control for the battery 80 in a first mode when the communication management unit 50 does not receive the drive request signal. The charge control unit 66 performs charge control for the battery 80 in a second mode when the communication management unit 50 does receive the drive request signal. In the first mode, a preliminary charge is performed with a preliminary charging current of I1, followed by a quick charge with a maximum charging current of I2. In the second mode, conversely, a slow charge is performed with a maximum charging current of I3. Here, the quick charging current I2 is higher than the slow charging current I3. The current values in the first and second modes have the following relationship:

Quick charging current I2>slow charging current
I3>preliminary charging current I1>0.

Controlled by the charge control unit 66, the charge management unit 70 supplies the charging currents to the battery 80. The charge management unit 70 manages the state of charge of the battery 80, and supplies status information indicating the state of charge of the battery 80 to the charge control unit 66 through a signal line 73. The status information is rendered in a 2-bit signal, which shows any one of the following four states: an abnormal state, a preliminary charge state, a normal charge state, and a full charge state. The abnormal state indicates that the battery 80 has an abnormal voltage value. The preliminary charge state indicates that the battery 80 is undergoing the preliminary charge. The normal charge state indicates that the battery 80 is undergoing the quick charge or the slow charge. The full charge state indicates that the battery 80 has completed charging and is fully charged.

In the present embodiment, the battery 80 is charged via USB. USB-based charging has the limitation of a maximum voltage of 5 V and a maximum current of 500 mA. Thus, even if the battery 80 has the charge capability of over 500 mA in charging current, the quick charging current I2 in the first mode must be set at or below 500 mA. Here, the quick charging current I2 is set to as high a value as possible, with consideration given to the current consumption of the IC chips and the like.

If the game apparatus 10 issues the drive request signal to the vibrating motor 84 during charging, the current to be supplied to the vibrating motor 84 is covered by the electric power that is supplied from the external power supply. In this case, the charging current I3 of the battery 80 must be determined by subtracting the current to be supplied to the vibrating motor 84 from the quick charging current I2 in the first mode. The reason for this is that the current from the external power supply cannot exceed the maximum current of 500 mA due to the limitations of the USB charging. Nevertheless, in the second mode, the small charging current I3 can also be used to slow-charge the battery 80 so as to reduce the time required to reach a full charge.

Figure 5A:
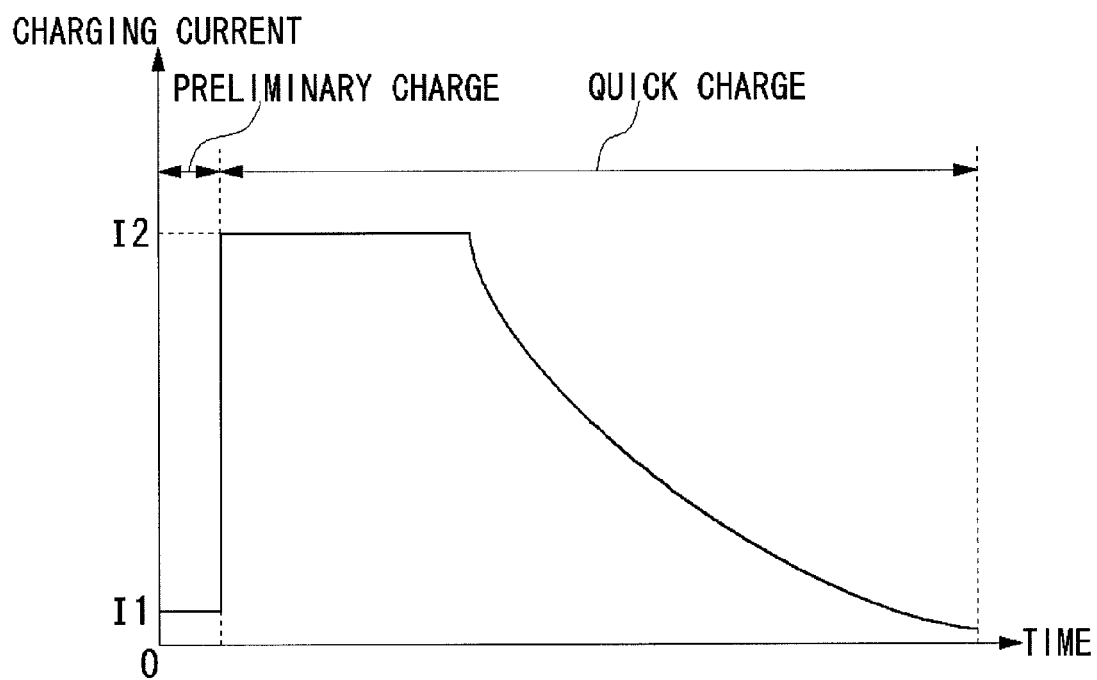
FIGS. 5A and 5B are charts showing battery charge processes in respective modes.

FIG. 5A shows the charge processes in the first mode of the battery. The first mode is a charge control mode to be performed when the vibrating motor 84 is not driven. At the beginning of charging, the battery 80 is charged in the first mode.

The preliminary charge is a charge process that takes account of the safety of charging. The charge management unit 70 performs a constant current charge process with the preliminary charging current I1 (for example, 40 mA) until it detects a battery voltage higher than or equal to a predetermined value (for example, 3 V). When the battery voltage is detected to be higher than or equal to the predetermined value, the charge management unit 70 starts a quick charge process. In the first half of the quick charge process, constant current charge is performed with the maximum charging current I2.

The wireless game controller 20 of the present embodiment requires a current consumption (system current) of approximately 50 mA in order to steadily drive the components other than the vibrating motor 84, such as the communication management unit 50, the system management unit 60, and the charge management unit 70. The maximum current supply from the USB is 500 mA. Assuming a USB current supply of 450 mA to allow some margin, the quick charging current I2 is thus set to 400 (=450−50) mA.

When the voltage of the battery charged with the quick charging current I2 reaches a full charge voltage, the charge management unit 70 performs a constant voltage charging process with the full charge voltage (for example, 4.2 V) in order to maintain favorable cycle characteristics of the battery 80. In the constant voltage charging process, the charging current decreases as the charging proceeds to increase the battery charge level. The charging current falls to or below a predetermined value (for example, 30 mA) when the charging ends. The charge management unit 70 monitors the charging current, and when the charging current falls to or below 30 mA, determines the completion of full charge and finishes charging.

Figure 5B:
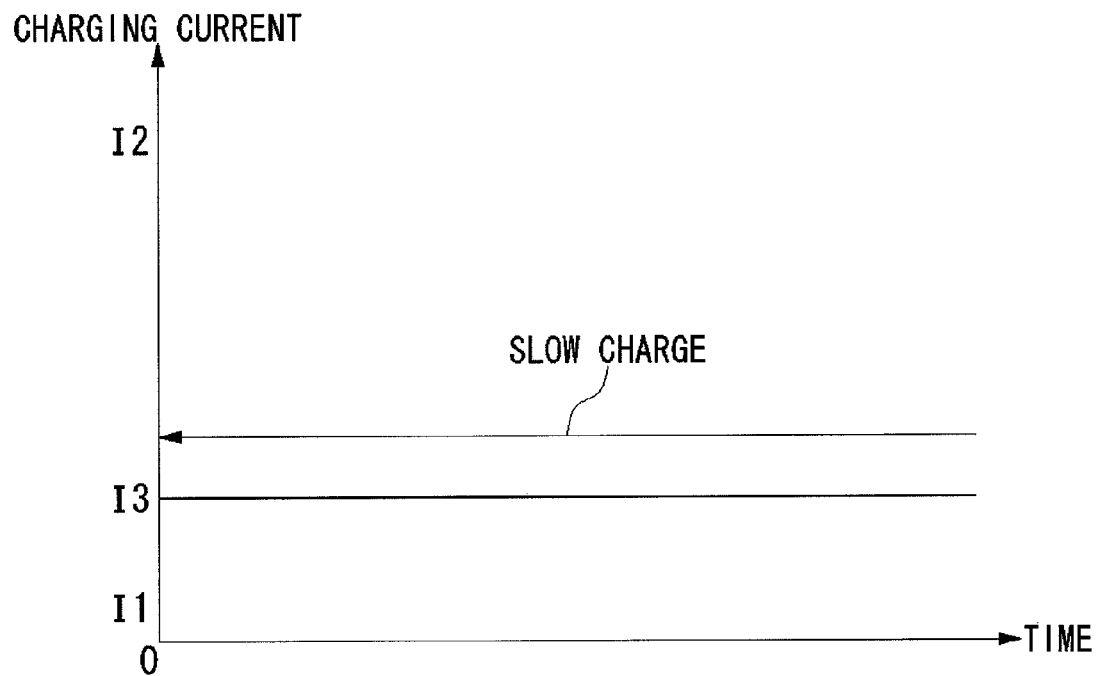

FIG. 5B shows the charge process in the second mode of the battery. The second mode is a charge control mode for charging the battery 80 while driving the vibrating motor 84. In the second mode, a slow charge process is executed to perform constant current charging with the slow charging current I3.

In the wireless game controller 20 of the present embodiment, the vibrating motor 84 has two motor elements, which are driven by a drive current of 150 mA each. That is, the vibrating motor 84 requires 300 mA to drive. Accordingly, the slow charging current I3 is set to 100 (=450−50−300) mA.

FIG. 5B shows the charge process where constant current charging continues with the slow charging current I3. When the voltage of the battery charged by the slow charging current I3 reaches the full charge voltage, the charge management unit 70 performs the constant voltage charging process with the full charge voltage. The constant voltage charging process is the same as described with reference to FIG. 5A.

The charge control modes are switched by the charge control unit 66 in response to reception of the drive request signal from the game apparatus 10. Receiving the drive request signal to the vibrating motor 84, the communication management unit 50 notifies it the system management unit 60. The charge control unit 66 recognizes that the vibrating motor 84 is to be driven, and instructs the charge management unit 70 to switch the charging current from the quick charging current I2 to the slow charging current I3. Note that this instruction does not necessarily require that the charge management unit 70 set the charging current to the slow charging current I3. If the battery 80 is near full charge, a charging current lower than the slow charging current I3 may be eventually supplied.

When the motor control unit 62 receives the notification as to the reception of the drive request signal from the communication management unit 50, it supplies the drive current to the vibrating motor 84 after a predetermined time interval has elapsed. Since the driving of the vibrating motor 84 is postponed for a predetermined time interval, it is possible for the charge management unit 70 to lower the charging current to the slow charging current I3 before the drive current is supplied to the vibrating motor 84. This can ensure that the vibrating motor 84 is prevented from being supplied with the drive current while the quick charging current I2 is being supplied to the battery 80.

In the present embodiment, the start of charging is controlled by the communication management unit 50. The communication management unit 50 has the function of determining whether the battery 80 is in a chargeable state or not, based on the status of the connection with an external device via the USB connector 40. If the USB connector 40 is connected directly to the game apparatus 10 through the USB cable 14, the battery 80 is determined to be in a chargeable state. If the USB cable 14 is connected with an external device that has no charge function, such as a hub, the battery is determined to be in a non-chargeable state. When connected to the game apparatus 10 through the USB cable directly or indirectly, the wireless game controller 20 functions as a wired game controller. The wireless game controller 20 therefore may sometimes be connected to the game apparatus 10 via a hub for the purpose of using it as a wired game controller, not for the purpose of charging. Accordingly, the communication management unit 50 has the function of determining whether the battery 80 is in the chargeable state or not, from the status of the connection with an external device. If the battery 80 is determined to be chargeable, the communication management unit 50 notifies the charge control unit 66. In response, the charge control unit 66 supplies the charge start instruction to the charge management unit 70, and the charge management unit 70 starts charge processing.

The end of charging is controlled by the charge management unit 70 as mentioned previously. When the charge management unit 70 determines that a full charge has been completed and finishes charging, it supplies a signal indicating the full charge state to the charge control unit 66 through the signal line 73 as status information. The charge control unit 66 supplies the status information to the communication management unit 50.

The charge management unit 70 has the function of monitoring the voltage of the battery 80 autonomously, and performing recharging if the voltage falls below a predetermined value (for example, 4.1 V). If the wireless game controller 20 and the game apparatus 10 are left connected with the USB cable 14, the battery 80 will therefore be recharged each time its voltage falls below the predetermined value due to natural discharge. Frequent recharging can affect the cycle characteristics of the battery 80 with the unfavorable consequence of a deterioration in battery life.

Accordingly, in the present embodiment, the communication management unit 50 controls the start of recharging of the battery 80 so as to avoid excessive recharging. To be more specific, when the communication management unit 50 receives the full-charge status information, it monitors the voltage of the battery 80 through the voltage of a voltage monitor line 53. It should be noted that, since the IC chip that constitutes the communication management unit 50 has a power supply voltage lower than the maximum voltage of the battery 80, it actually monitors a partial voltage of the battery 80 to acquire the voltage value of the battery 80. If the battery 80 has a voltage higher than or equal to a predetermined value (a voltage value lower than 4.1 V at which the charge management unit 70 performs recharging autonomously; for example, 3.8 V), the communication management unit 50 determines that the charging of the battery 80 should be disabled and notifies the charge control unit 66. In response, the charge control unit 66 supplies a charge disable instruction to the charge management unit 70, thereby disabling the autonomous recharge processing by the charge management unit 70. If the voltage of the battery 80 falls below the predetermined value (3.8 V), the communication management unit 50 determines that the charging of the battery 80 should be enabled and notifies the charge control unit 66. In response, the charge control unit 66 supplies a charge start instruction to the charge management unit 70, whereby the charge processing in the first mode is started.

It should be appreciated that the foregoing processing of the communication management unit 50 provides a recharge control to be performed only when the connection of the USB cable 14 between the wireless game controller 20 and the game apparatus 10 is maintained for a long period of time. When the wireless game controller 20 and the game apparatus 10 are initially connected with the USB cable 14, the communication management unit 50 determines whether the battery 80 is chargeable or not based on the connection status with an external device irrespective of the status information on the battery 80 as described above.

FIGS. 6A to 6C are timing charts for the charge processes according to the present embodiment. FIG. 6A shows the ON/OFF timing of the drive request signal which is supplied from the game apparatus 10. FIG. 6B shows variations in the charging current to be supplied to the battery 80. FIG. 6C shows the drive timing of the vibrating motor 84.

At time $t_0$, the wireless game controller 20 is connected to the game apparatus 10 with the USB cable 14. The communication management unit 50 checks the connection status with the external device. If it is determined that the connected external device is capable of charging, the communication management unit 60 notifies the charge control unit 66 of the system management unit 60. The charge control unit 66 sends a charge start instruction to the charge management unit 70, and the charge management unit 70 starts charge control in the first mode. In the first mode, a preliminary charge is followed by a quick charge.

Before the battery 80 is fully charged by the quick charge, a drive request signal is transmitted from the game apparatus 10 at time $t_1$. When the communication management unit 50 receives the drive request signal, it notifies reception of the drive request signal to the system management unit 60.

At time $t_1$, the charge control unit 66 of the system management unit 60 receives the notification of reception of the drive request signal, and switches the charging current of the battery 80 from the quick charging current I2 to the slow charging current I3. Consequently, the charge management unit 70 starts charge control in the second mode at time $t_1$.

Receiving the notification of reception of the drive request signal, the motor control unit 62 waits for an offset time interval T1 from time $t_1$, and then supplies the drive current to the vibrating motor 84. This can ensure that the charging current is lowered before supplying the drive current to the vibrating motor 84. For example, this offset time interval T1 is set to as short as 3 ms or so. The setting of several microseconds makes it possible to provide vibrations from the vibrating motor 84 approximately in real time in accordance with the progress of the game without giving a sense of time lag to the user.

The drive request signal transmitted at time $t_1$ continues to be transmitted as consecutive packet signals until time $t_2$. The drive stop signal is then transmitted continuously, and the drive request signal is continuously transmitted again from time $t_3$ to time $t_4$. Thereafter, the drive stop signal is continuously transmitted again, and the drive request signal is continuously transmitted again from time $t_5$ to time $t_6$.

Depending on game applications, the drive request signal may be transmitted intermittently at high frequencies. For example, in a racing game or the like, the drive request signal is transmitted frequently from the game apparatus 10 to the vibrating motor 84 so as to give a virtual sense of road conditions to the user. In such cases, the burden on the battery 80 increases if the charging current is switched between the slow charging current I3 and the quick charging current I2 each time the vibrating motor 84 is switched ON/OFF. Thus, in the second mode, the charge control unit 66 postpones switching the charge control to the first mode until a predetermined time interval T2 elapses after the drive request signal is last received. That is, charge control is not switched to the first mode until the interval in which the communication management unit 50 has not received the drive request signal reaches the predetermined time interval T2. This can prevent the charging current from varying frequently, and can thus reduce the burden on the battery 80. For example, the time interval T2 may be set to several minutes or so.

In the example of FIG. 6B, the charge control unit 66 switches the charging current of the battery 80 from the slow charging current I3 to the quick charging current I2 at time $t_7$, i.e., after the elapse of the predetermined time interval T2 since the drive request signal was last received at time $t_6$. The charge management unit 70 consequently resumes charge control in the first mode. After this resumption, the charge management unit 70 determines the completion of full charge at time $t_8$, and ends the charge processing.

In the present embodiment, the charge control continues across different modes. Nevertheless, the charge control unit 66 may reset the charge control when changing modes. For example, when the first mode ends, the charge control unit 66 may end charging once before performing the charge process in the second mode where a preliminary charge is followed by a slow charge. When this second mode ends, charging may be ended again before the charge processes are performed in the first mode where a preliminary charge is followed by a quick charge. If charge control is reset between modes as above, the burden on the battery 80 becomes particularly high. In such cases, the burden on the battery 80 can be reduced by postponing switching of charge control to the first mode until the predetermined time interval T2 elapses from when the drive request signal is last received in the second mode.

Figure 7:
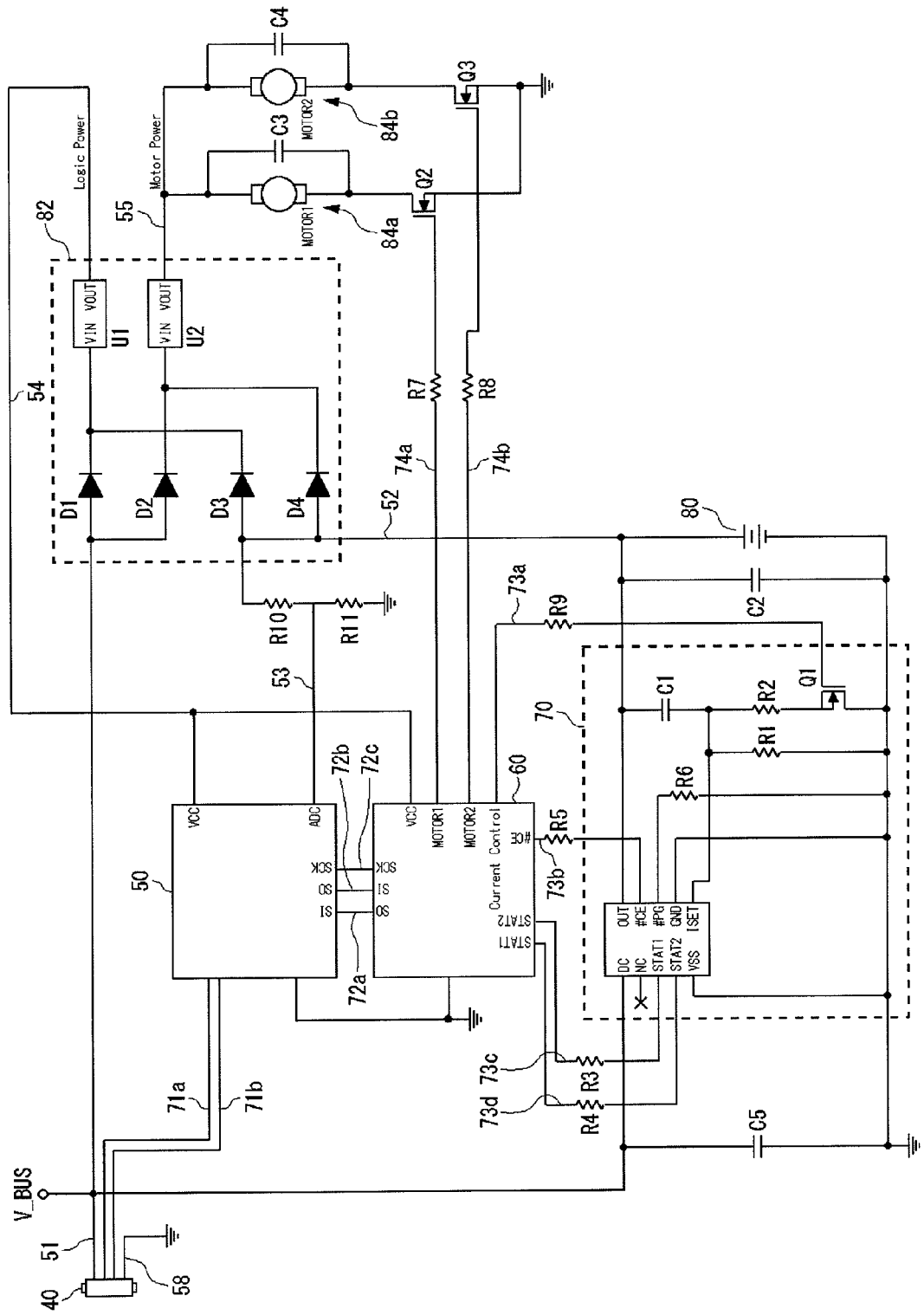
FIG. 7 is a diagram showing the configuration of a circuit for performing charge control in the wireless game controller.

FIG. 7 shows the configuration of a circuit for performing charge control in the wireless game controller 20. When the USB cable 14 is connected to the USB connector 40, the game apparatus 10 and the communication management unit 50 transmit and receive data through differential signal lines 71*a* and 71*b*. The USB connector 40 supplies a ground voltage, which is supplied from the game apparatus 10, to the wireless game controller 20 through a ground line 58. It also supplies the power supply voltage to the switching unit 82 through the power supply line 51.

The switching unit 82 includes diodes D1, D2, D3, and D4, and regulators U1 and U2. The power supply line 51 is connected to the inputs of the diodes D1 and D2. The output of the diode D1 is connected to the regulator U1, and the output of the diode D2 is connected to the regulator U2. The power supply line 52 from the battery 80 is connected to the inputs of the diodes D3 and D4. The output of the diode D3 is connected to the regulator U1, and the output of the diode D4 is connected to the regulator U2.

The regulator U1 receives the higher voltage of those input to the diodes D1 and D3. Consequently, the voltage of the external power supply is input to the regulator U1 when charging, and the voltage of the battery 80 is input to the regulator U1 when not charging. Similarly, the regulator U2 receives the higher voltage of those input to the diodes D2 and D4. That is, the voltage of the external power supply is input to the regulator U2 when charging, and the voltage of the battery 80 is input to the regulator U2 when not charging. The regulator U1 outputs the drive voltage of the IC chips of the communication management unit 50 and the system management unit 60 to the power supply line 54. The regulator U2 outputs the drive voltage of the vibrating motors 84*a* and 84*b* to the power supply line 55.

The communication management unit 50 monitors a partial voltage of the battery 80 divided by the resistors R10 and R11 through the voltage monitor line 53, thereby acquiring the voltage of the battery 80. The communication management unit 50 outputs data to the system management unit 60 through a data line 72*a*. The output data of the communication management unit 50 includes a notification of reception of the drive request signal from the game apparatus 10, and a notification as to charge control based on the connection status with external devices and the voltage of the battery 80.

The system management unit 60 outputs data to the communication management unit 50 through a data line 72*b*. The output data of the system management unit 60 includes status information regarding the battery 80. The communication management unit 50 and the system management unit 60 share a clock through a clock line 72*c*.

The system management unit 60 controls the starting and stopping of charging by the charge management unit 70 through a control line 73*b*. This control is exercised based on a notification as to charge control from the communication management unit 50. The system management unit 60 also controls a transistor Q1 to turn it ON/OFF through a control line 73*a*. The transistor Q1 is turned ON/OFF to switch the charging current of the battery 80 between the quick charging current I2 and the slow charging current I3. Specifically, when the transistor Q1 is ON, the charging current to the battery 80 that is generated depends on a combined resistance of the resistors R1 and R2, which are connected in parallel. When the transistor Q1 is OFF, on the other hand, the charging current to the battery 80 that is generated depends on the resistance of the resistor R1. The resistances of the resistors R1 and R2 can be set appropriately so that the quick charging current I2 is supplied to the battery 80 when the transistor Q1 is ON, and the slow charging current I3 is supplied to the battery 80 when the transistor Q1 is OFF. The transistor Q1 can thus be switched ON/OFF to easily change the charge control mode of the battery 80.

When the system management unit 60 is notified by the communication management unit 50 of reception of the drive request signal, it turns OFF the transistor Q1 to perform charge control in the second mode. The system management unit 60 keeps the transistor Q1 OFF until a predetermined time interval has elapsed since notification of the reception of the drive request signal is last received. After the elapse of the predetermined time interval, the system management unit 60 turns ON the transistor Q1 to resume charge control in the first mode.

After a predetermined time interval from the transistor Q1 being switched from ON to OFF has elapsed, the system management unit 60 turns transistors Q2 and Q3 ON through control lines 74a and 74b. This can ensure completion of switching from the first mode to the second mode before driving the vibrating motors 84a and 84b.

The charge management unit 70 receives the power supply voltage of the external power supply through the power supply line 51, and outputs the same from its output terminal (OUT). As described above, the charging current to the battery 80 is adjusted by controlling ON/OFF the transistor Q1. The charge management unit 70 monitors the voltage value of the battery 80 through the OUT terminal, and controls switching from the preliminary charge to the quick charge and switching from the constant current charging to constant voltage charging during the quick charge. The charge management unit 70 also monitors the charging current of the battery 80 through an ISET terminal. If the charging current falls below a predetermined value (for example, 30 mA) during constant voltage charging in the quick charge, the charge management unit 70 determines that the battery has reached full charge, and finishes charging. The charge management unit 70 transmits status information indicating the state of charge of the battery 80 to the system management unit 70 through data lines 73c and 73d.

The above circuit configuration realizes the charge control that has been described with reference to FIGS. 6A to 6C. It should be appreciated that while FIG. 7 shows a circuit configuration in which the communication management unit 50, the system management unit 60, and the charge management unit 70 are composed of separate respective IC chips, these functions may be integrated into one or two IC chips as mentioned previously. Alternatively, the functions may be subdivided into four or more IC chips.

Up to this point, the present invention has been described in conjunction with the embodiment thereof. This embodiment is given solely by way of illustration. It will be understood by those skilled in the art that various modifications may be made to combinations of the foregoing components and processes, and all such modifications are also intended to fall within the scope of the present invention.

The embodiment has illustrated a case where the second mode performs the slow charge process with a slow charging current I3>0. Alternatively, charge processing may be stopped in the second mode, in which case the preliminary charging current and the slow charging current may be set to zero.

The communication management unit 50 may transmit the status information regarding the battery 80 to the game apparatus 10. The game apparatus 10 may display information indicating the state of charge of the battery 80 on the image display apparatus 3 so that the user can be made aware of the state of charge.

While the present embodiment has employed the vibrating motor 84 as a load, the wireless game controller 20 may include other loads.

What is claimed is:

1. A terminal device comprising:
a battery which stores electric power;
a charge control unit which supplies electric power from an external power supply to the battery;
a load which is driven by a drive current supplied thereto;
a communication management unit which receives a drive request signal for the load; and
a load control unit which supplies the drive current to the load in accordance with the drive request signal, wherein
the charge control unit performs charge control for the battery in a first mode when the communication management unit does not receive the drive request signal, and performs charge control for the battery in a second mode when the communication management unit does receive the drive request signal.

2. The terminal device according to claim 1, wherein the charge control unit performs the charge control for the battery in the first mode using a charging current higher than that in the second mode.

3. The terminal device according to claim 1, wherein the load control unit supplies the drive current to the load after a predetermined first time interval elapses since the communication management unit received the drive request signal.

4. The terminal device according to claim 1, wherein when the communication management unit does not receive the drive request signal for a predetermined second time interval in the second mode, the charge control unit switches the charge control to the first mode.

* * * * *